United States Patent
Gase et al.

(10) Patent No.: US 8,220,203 B2
(45) Date of Patent: Jul. 17, 2012

(54) SLIDING DOOR TAMBOUR CLOSE OUT PANEL

(75) Inventors: Brian Gase, Carleton, MI (US); Todd William Dishman, Detroit, MI (US); Adrian Nicholas Alexander Elliott, Dearborn, MI (US); Craig Blust, Oakland, MI (US); Dave Michael Lechkun, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 478 days.

(21) Appl. No.: 12/496,323

(22) Filed: Jul. 1, 2009

(65) Prior Publication Data

US 2011/0000139 A1 Jan. 6, 2011

(51) Int. Cl.
*E05F 11/00* (2006.01)

(52) U.S. Cl. .............. 49/360; 296/155; 160/37; 160/230

(58) Field of Classification Search .................... 49/209, 49/211, 216, 218, 219, 221, 223, 224; 160/37, 160/231.1, 231.2, 230; 296/155
See application file for complete search history.

(56) References Cited

U.S. PATENT DOCUMENTS

| | | | | |
|---|---|---|---|---|
| 3,848,721 A | * | 11/1974 | Smit | 192/133 |
| 3,870,391 A | * | 3/1975 | Nims | 312/297 |
| 3,935,674 A | * | 2/1976 | Williams et al. | 49/212 |
| D341,274 S | * | 11/1993 | van den Nieuwelaar | D6/433 |
| 5,372,175 A | * | 12/1994 | Calhoun et al. | 160/235 |
| 6,776,450 B2 | | 8/2004 | Okubo et al. | |
| 7,261,364 B2 | | 8/2007 | Tanigawa | |
| 7,896,425 B2 | * | 3/2011 | Elliott et al. | 296/146.12 |
| 2004/0149401 A1 | * | 8/2004 | Rinkewich | 160/235 |
| 2005/0082871 A1 | * | 4/2005 | Anders | 296/155 |
| 2009/0133316 A1 | * | 5/2009 | Richter | 43/54.1 |

FOREIGN PATENT DOCUMENTS

| | | |
|---|---|---|
| FR | 2801251 | 11/1999 |
| GB | 738486 | 10/1955 |
| JP | 2008155822 | 7/2008 |
| JP | 2008162382 | 7/2008 |
| JP | 2008095728 | 8/2008 |

* cited by examiner

*Primary Examiner* — Jerry Redman
(74) *Attorney, Agent, or Firm* — Gregory P. Brown; Price Heneveld LLP

(57) ABSTRACT

A cover assembly for an opening in a sliding vehicle door system including a linkage arm operably associated with the vehicle door and a vehicle body. Also included is a tambour door panel associated with the linkage arm. Further included is a channel located proximate a door trim panel having at least one slot, the channel including an opening capable of allowing the linkage arm to pass through at least a portion of the channel, where at least a portion of the tambour door panel slidably travels within the channel, wherein a sliding motion of the vehicle door imparts movement on the linkage arm, the linkage arm sliding within the at least one slot and the channel, and wherein the linkage arm simultaneously imparts movement on the tambour door panel.

19 Claims, 6 Drawing Sheets

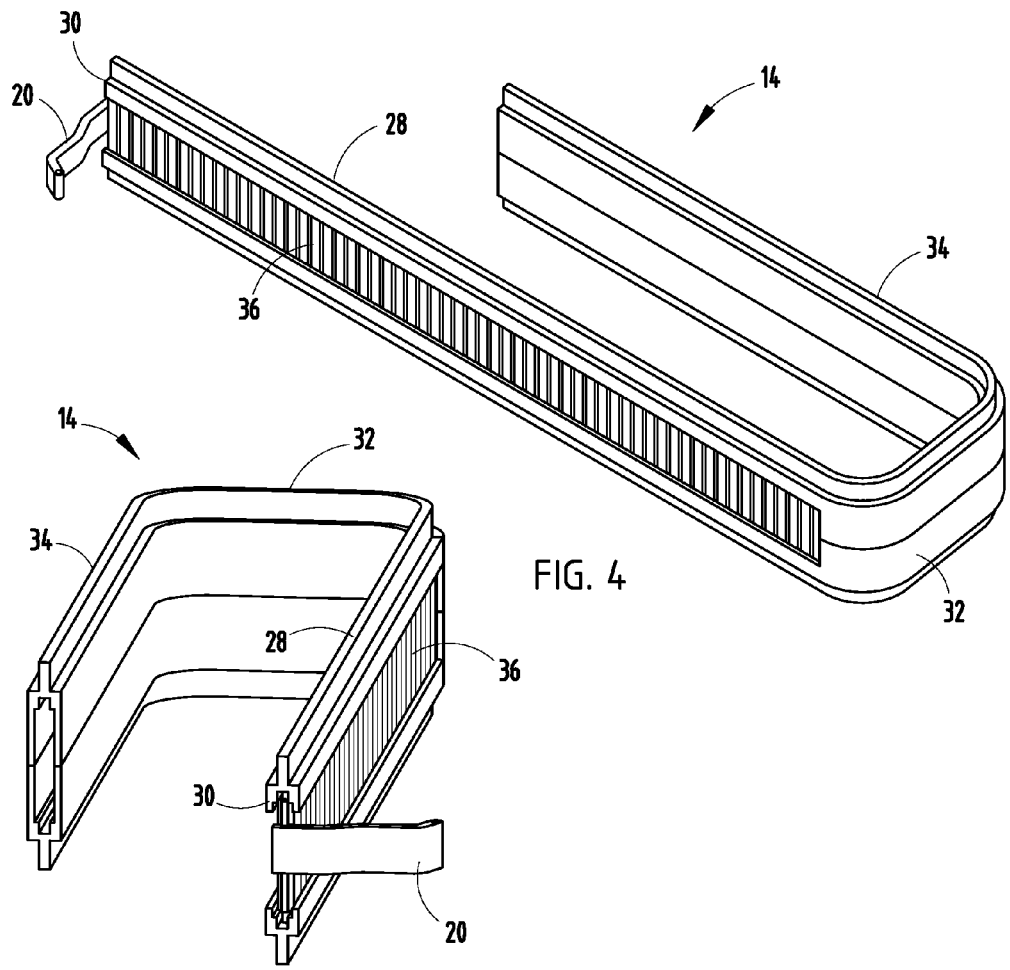
FIG. 4
FIG. 5
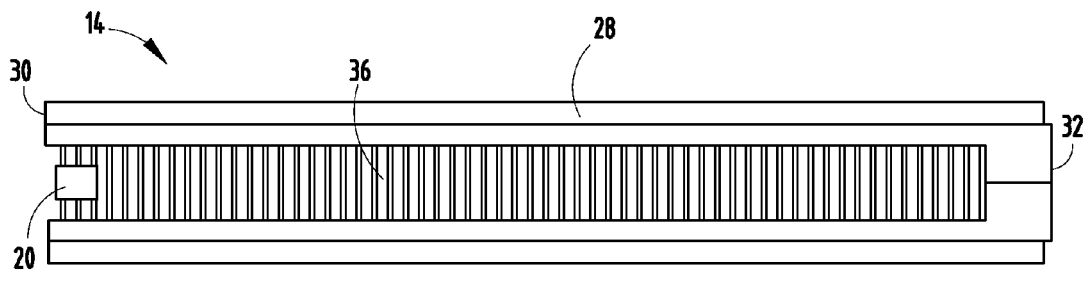
FIG. 6

SLIDING DOOR TAMBOUR CLOSE OUT PANEL

FIELD OF THE INVENTION

The present invention generally concerns vehicle trim panel openings, and more particularly relates to sliding close out panels for such openings.

BACKGROUND OF THE INVENTION

Vehicle sliding doors generally require sliding mechanisms mounted to the door that facilitate opening and closing of the door relative to the vehicle body. The sliding mechanism will often include tracks and at least one linkage arm that connects the vehicle door to the vehicle body. To properly function, there typically are open areas in the door trim panel which allow the linkage arm to freely slide through the trim opening when opening or closing the door. These open areas, often in the form of permanent slots in the trim panel, are unsightly and may be considered unacceptable for craftsmanship and functionality. Accordingly, an apparatus is desired having the advantages of covering sliding mechanism components and the trim panel opening, as well as solving and/or making improvements on the aforementioned disadvantages.

SUMMARY OF THE INVENTION

An aspect of the present invention is to provide a sliding vehicle door for covering an opening in a vehicle body. The door includes a door trim panel having at least one slot. Also included in the door is a linkage arm operably connecting the vehicle door to the vehicle body. Further included in the door is a tambour door panel fixedly engaged with the linkage arm. Finally included is a channel located proximate the door trim panel, with the channel including a first body portion aligned substantially parallel to the vehicle door, a second body portion aligned substantially parallel to the vehicle door, and an end portion connecting the first and second body portions, wherein at least one of the first and second body portions has an opening along the longitudinal axis thereof, capable of receiving the tambour door panel, and where a sliding motion of the vehicle door imparts movement on the linkage arm, with the linkage arm sliding within the at least one slot of the door trim panel, thereby generating movement of the tambour door panel within the channel.

Another aspect of the present invention is to provide a cover assembly for an opening in a sliding vehicle door system. The assembly includes a linkage arm operably associated with the vehicle door and the vehicle body. Also included in the assembly s a tambour door panel associated with the linkage arm. Further included in the assembly is a channel located proximate a door trim panel having at least one slot, the channel including an opening capable of allowing the linkage arm to pass through at least a portion of the channel, wherein at least a portion of the tambour door panel slidably travels within the channel, wherein a sliding motion of the vehicle door imparts movement on the linkage arm, the linkage arm sliding within the at least one slot and the channel, and wherein the linkage arm simultaneously imparts movement on the tambour door panel.

A further aspect of the present invention is to provide a method for covering an opening in a sliding door trim panel. The method includes the step of providing a door trim panel having at least one slot, a linkage arm operably associated with the sliding door and the vehicle body, a tambour door panel associated with the linkage arm, and a channel located proximate the door trim panel, the channel having an opening capable of allowing the linkage arm to pass through at least a portion of the channel, wherein at least a portion of the tambour door panel slidably travels within the channel. The method also includes the step of generating a sliding movement for the sliding door. The method further includes the step of imparting movement on the linkage arm operably associated with the sliding door. The method finally includes the step of driving the tambour door panel with the linkage arm through the channel to a position that covers at least a portion of the opening in the sliding door trim panel.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 4 is a side, perspective view of the channel with the tambour door panel in an extended position;

FIG. 5 is a front, perspective view of the channel with the tambour door panel in an extended position;

FIG. 6 is a side view of the channel with the tambour door panel in an extended position;

DETAILED DESCRIPTION OF THE PREFERRED EMBODIMENTS

Figure 1:
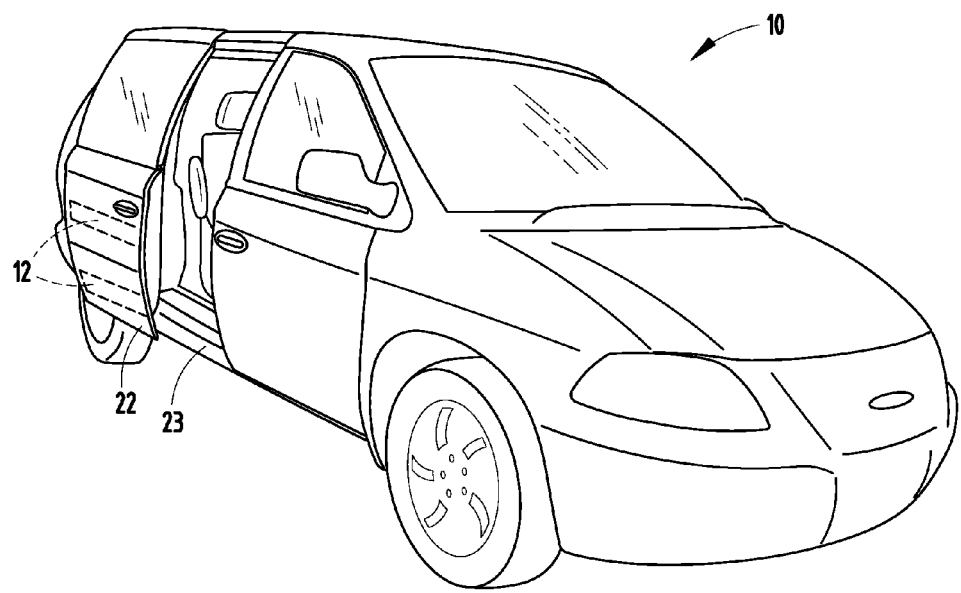
FIG. 1 is a perspective view of an automobile having a cover assembly for an opening in a sliding vehicle door.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
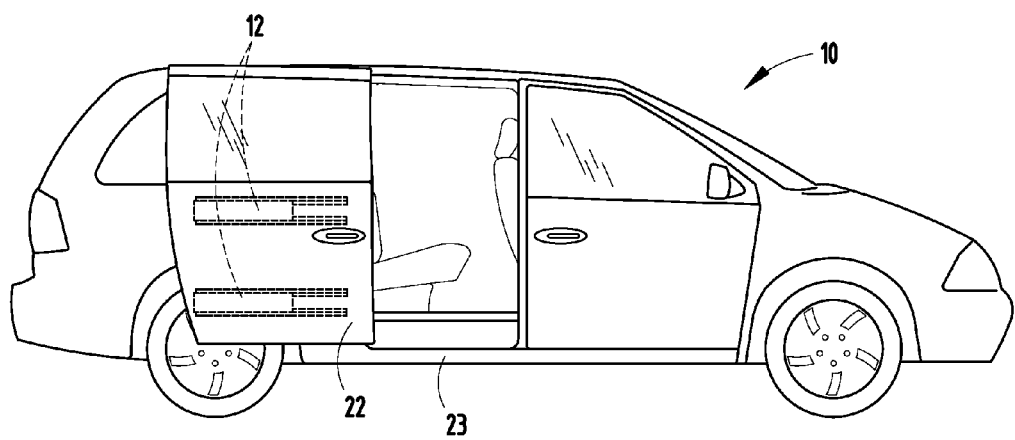
FIG. 2 is a side view of the automobile having a cover assembly for an opening in a sliding vehicle door.

Referring to FIGS. 1 and 2, the reference number 10 generally designates a motor vehicle having a pair of cover assemblies 12 for a pair of openings in a sliding vehicle door 22. In the illustrated examples, each cover assembly 12 for an opening in a sliding vehicle door system includes a linkage arm operably associated with the vehicle door 22 and a vehicle body 23. Also included in the cover assembly 12 is a tambour door panel associated with each linkage arm. The cover assembly further includes a channel located proximate a door trim panel having at least one slot, the channel including an opening capable of allowing the linkage arm to pass through at least a portion of the channel, wherein at least a portion of the tambour door panel slidably travels within the channel, wherein a sliding motion of the vehicle door 22 imparts movement on the linkage arm, the linkage arm sliding within the at least one slot and the channel, and where the linkage arm simultaneously imparts movement of the tambour door panel.

Figure 3A:
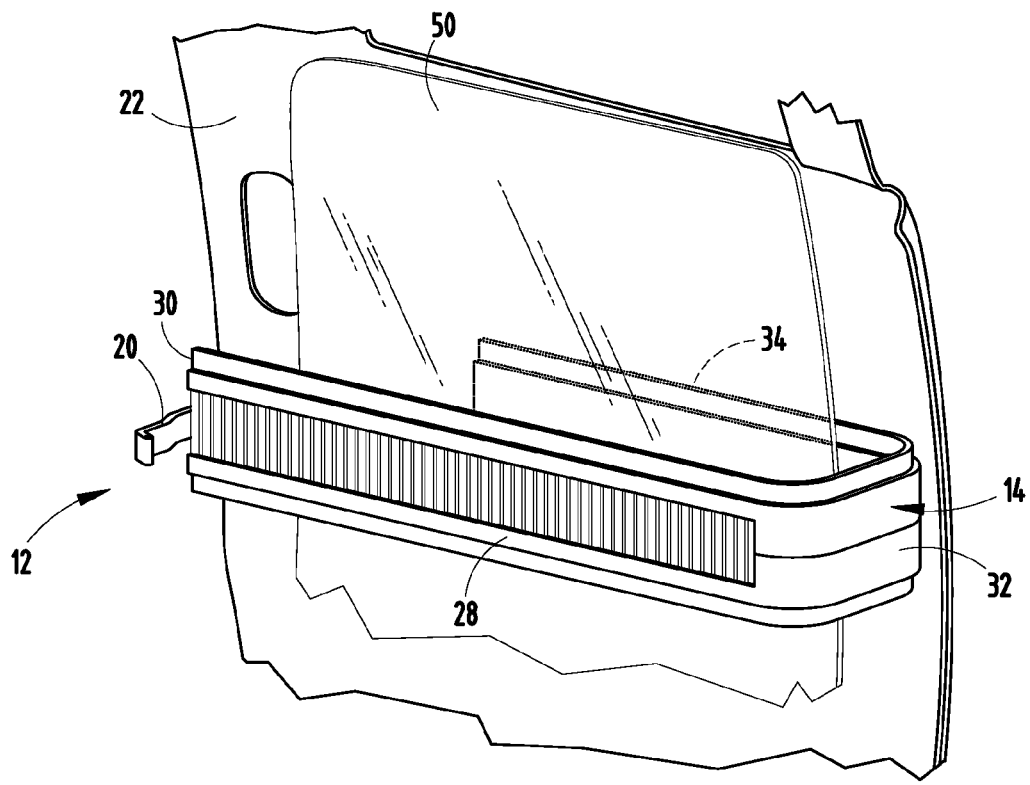
FIG. 3A is a perspective view of the sliding vehicle door having a channel with a tambour door panel in an extended position.
Figure 3B:
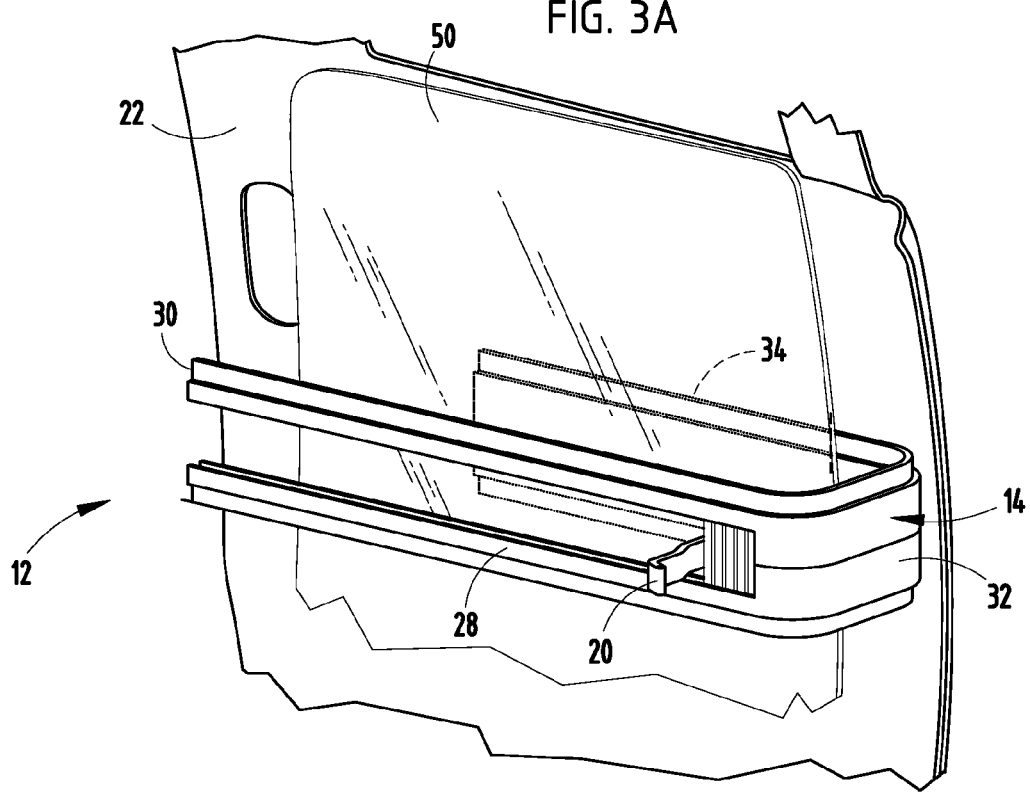
FIG. 3B is a perspective view of the sliding vehicle door having a channel with the tambour door panel in a retracted position.
Figure 3C:
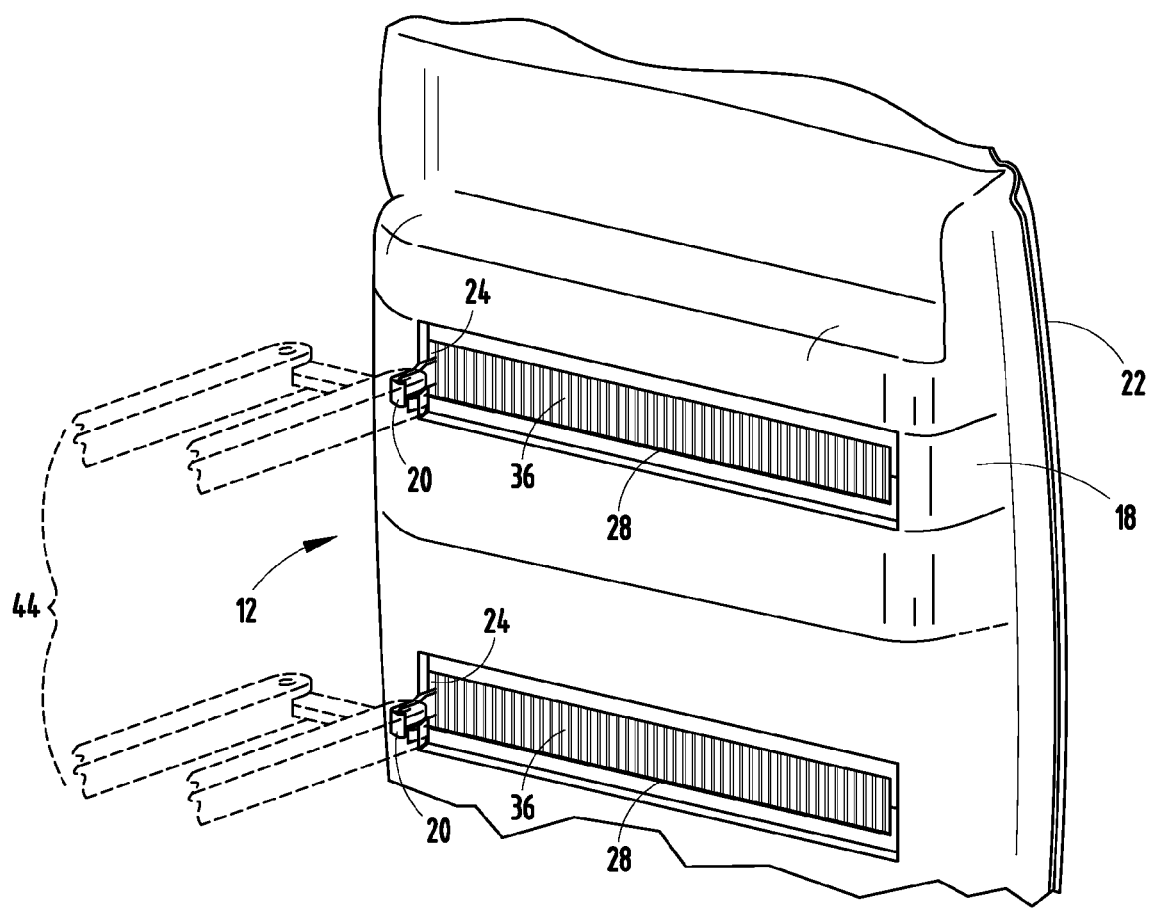
FIG. 3C is a perspective view of the sliding vehicle door having a connection to a four-bar linkage illustrating trim paneling.
Figure 7:
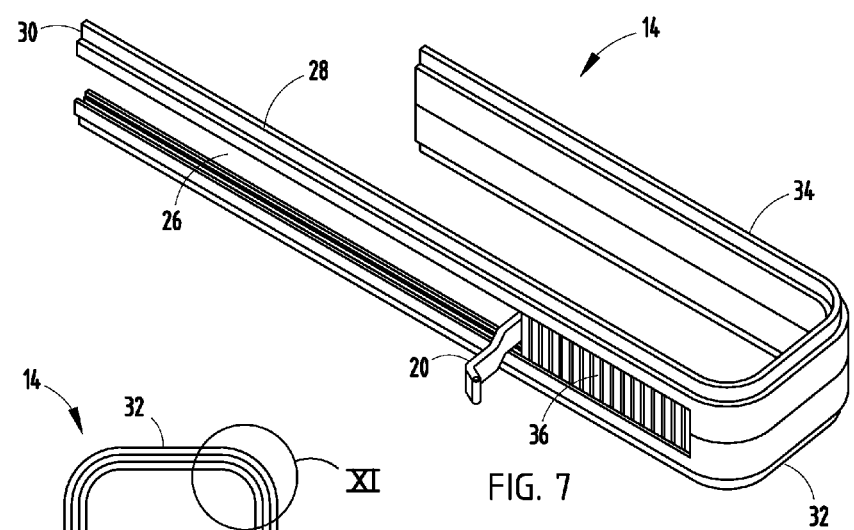
FIG. 7 is a side perspective view of the channel with the tambour door panel in a retracted position.
Figure 8:
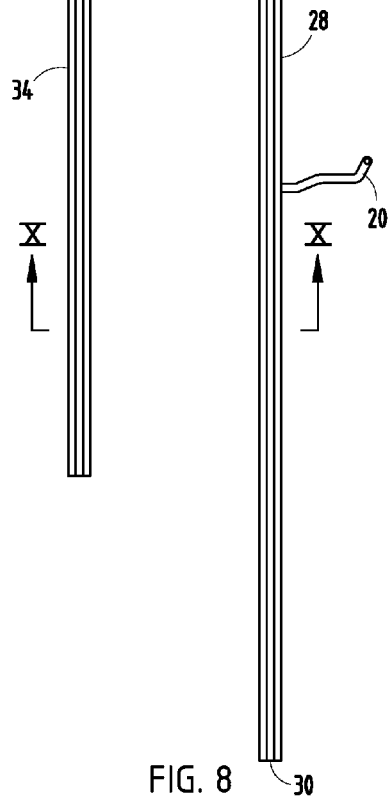
FIG. 8 is a top view of the channel with the tambour door panel in a retracted position.
Figure 9:
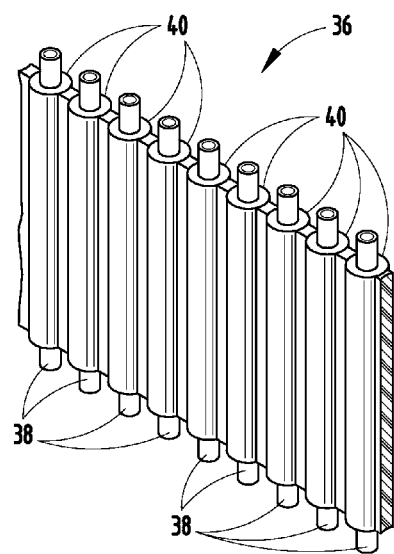
FIG. 9 is a perspective view of a portion of the tambour door panel.
Figure 10:
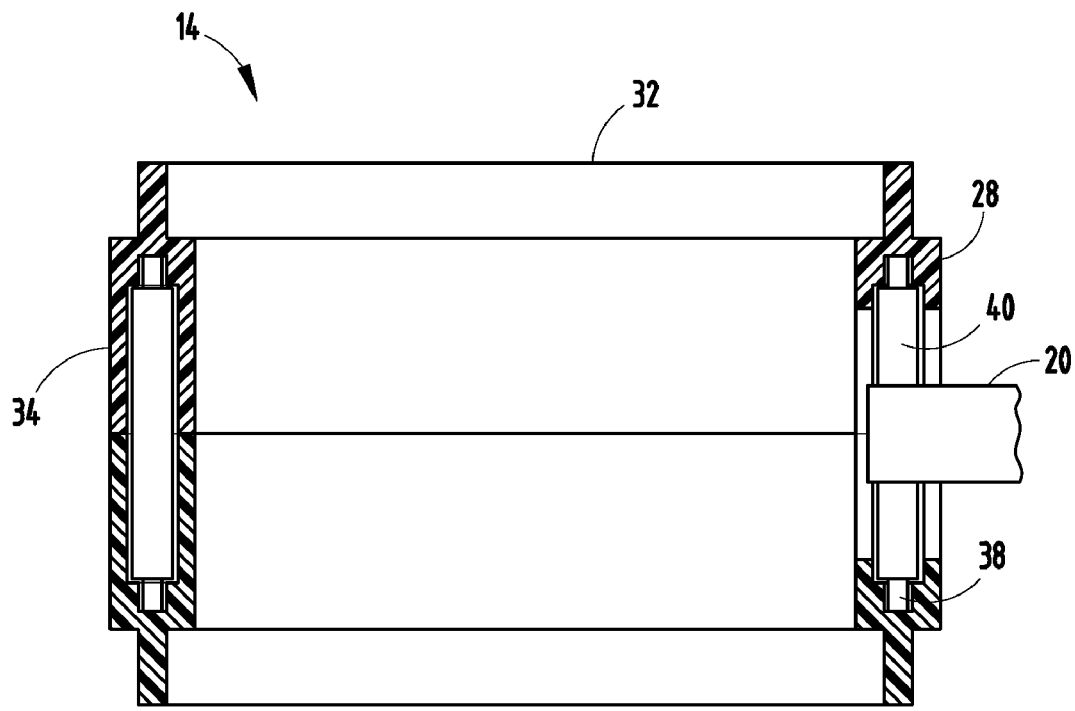
FIG. 10 is a front, cross-sectional view of the channel having the tambour door panel, taken along the line X-X of FIG. 8.
Figure 11:
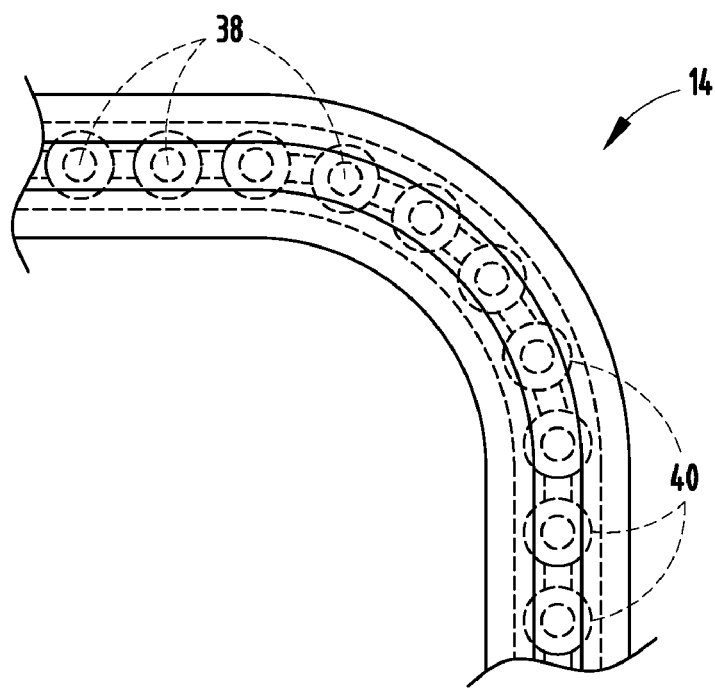
FIG. 11 is an enlarged view of section XI of FIG. 8, illustrating a top view of a portion of the channel having the tambour door panel.

FIGS. 3A and 3B illustrate a channel 14 located proximate a glass or panel sheet 50 generally on the inside of the vehicle door 22. The channel 14 is configured to wrap around both the front side and back side of the glass or panel sheet and may be made of a rigid material, such as plastic. A linkage arm 20 that connects the vehicle door 22 and the vehicle body 23 facilitates the sliding movement of the vehicle door 22 relative to the vehicle body 23 as the door 22 opens and closes. During this door opening and closing process, the linkage arm 20 slides along tracks located within a slot 24 of the trim panel member 18. The linkage arm 20 is typically part of a plurality of linkage arms that facilitate sliding of the door 22 relative to the vehicle body 23, such as a four-bar linkage 44 according to one embodiment. However, as described above, it is conceivable that a single linkage arm could be present with a single cover assembly 12, according to another embodiment. In the case of a four-bar linkage 44, an additional channel 14 may be included in the vehicle door 22. Such a configuration would allow linkage arms at multiple locations to pass through vehicle door openings, while still being covered by a corresponding number of tambour door panels 36, as shown in FIG. 3C.

Referring to FIGS. 4-6, the channel 14 may be manufactured as one continuous structure or multiple components acting as a single channel, and in either manner, may be described as having three main portions. Typically, a channel opening 26 will extend along a first portion 28 of the channel 14 from a first end 30 to a second portion 32 of the channel 14, with the second portion 32 being an end portion that wraps 180° around the glass or panel sheet 50. The end portion transitions into a third channel portion 34, with a first and third portion 28 and 34 at a substantially planar geometry and extending parallel to each other. The first portion 28 of the channel 14 is located on the side of the glass or panel sheet 50 facing the interior of the vehicle 10 and the channel opening 26 is aligned with the slot 24 of the panel member 18, such that a single opening is visible from the interior of the vehicle 10.

FIGS. 7-11 illustrate a tambour door panel 36 that resides within the channel 14. The channel 14 is long enough to cover all, or some other desired amount, of the panel member slot 24. The tambour door panel 36 is operatively associated with the linkage arm 20, such that movement of the linkage arm 20 during sliding, opening and closing of the vehicle door 22 generates a corresponding translation of the tambour door panel 36 through the channel 14. The tambour door panel 36 may be associated with the linkage arm 20 via screws, bolts, clips, or any other suitable mechanical fastener. The tambour door panel 36 may be made of a plurality of slats 38 that are interconnected 40 to one another. The tambour door panel 36 is trapped within the channel 14 at both the top and bottom ends such that the panel 36 slides therein. The slats 38 may be made of any suitable geometric configuration, such as circular or rectangular, for example. The tambour door panel 36 may be manufactured out of any material that results in the tambour door 36 being stiff enough to provide a rigid cover when in the extended position, thereby preventing access to interior regions of the door 22, yet flexible enough to deflect, particularly when curving through the arced end portions during translation of the tambour door panel 36. Flexibility may be accomplished by manufacturing the slat connections 40 as indentations that allow bending of one slat 38 relative to an adjacent slat 38, or by introducing a flexible material, such as a webbing, at the connection points. The flexible material may be a cloth, leather, or any other suitable material.

The tambour door panel 36 is extended to cover all, or a portion, of the channel opening 26 upon closing of the vehicle door 22. As the door 22 is slid into a closed position, the tambour door panel 36 functions to cover the channel opening 26 as well as the vehicle door slot 24 and any other door openings that result from the necessary presence of components employed to facilitate operation of the sliding vehicle door 22. Conversely, as the door 22 is opened, the tambour door panel 36 retracts and translates within the channel 14 to allow the linkage arm 20 to pass through the channel 14, as necessary.

Accordingly, the tambour door panel advantageously moves to close out and cover a vehicle door opening that is necessarily present in sliding vehicle door systems, thereby providing an aesthetically-pleasing look for vehicle passengers when the vehicle door is in the closed position.

It is to be understood that variations and modifications can be made on the aforementioned structure without departing from the concepts of the present invention, and further it is to be understood that such concepts are intended to be covered by the following claims, unless these claims by their language expressly state otherwise.

We claim:

1. A sliding vehicle door for covering an opening in a vehicle body comprising:
    a door trim panel having at least one slot;
    a linkage arm operably connecting the vehicle door to the vehicle body;
    a tambour door panel fixedly engaged with the linkage arm; and
    a channel located proximate the door trim panel, the channel comprising:
        a first body portion aligned substantially parallel to the vehicle door;
        a second body portion aligned substantially parallel to the vehicle body; and
        an end portion connecting the first and second body portions, wherein at least one of the first and second body portions has an opening along the longitudinal axis thereof, capable of receiving the tambour door panel, and wherein a sliding motion of the vehicle door imparts movement on the linkage arm, the linkage arm sliding within the at least one slot of the door trim panel, thereby generating movement of the tambour door panel within the channel.

2. The sliding vehicle door of claim 1, wherein the tambour door panel includes a plurality of vertically aligned slats that are operatively joined to each other.

3. The sliding vehicle door of claim 2, wherein the plurality of vertically aligned slats are operatively joined by a flexible material.

4. The sliding vehicle door of claim 3, wherein the flexible material is a cloth or leather foundation.

5. The sliding vehicle door of claim 2, wherein the tambour door panel is slidably movable between an extended position when the sliding vehicle door is in a closed position and a retracted position when the sliding vehicle door is in an opened position.

6. The sliding vehicle door of claim 5, wherein the plurality of vertically aligned slats are made of a stiff material, such that the tambour door panel is capable of forming a solid panel that covers the door trim panel slot and the channel when in the fully extended position.

7. The sliding vehicle door of claim 2, wherein the channel end portion wraps around an edge of a glass or panel sheet within the sliding vehicle door.

8. A cover assembly for an opening in a sliding vehicle door system comprising:
   a linkage arm operably associated with a vehicle door and a vehicle body;
   a tambour door panel associated with the linkage arm; and
   a channel located proximate a door trim panel having at least one slot, the channel including an opening capable of allowing the linkage arm to pass through at least a portion of the channel, wherein at least a portion of the tambour door panel slidably travels within the channel, wherein a sliding motion of the vehicle door imparts movement on the linkage arm, the linkage arm sliding within the at least one slot and the channel, wherein a channel end portions wraps around an edge of a glass or panel sheet within the sliding vehicle door, and wherein the linkage arm simultaneously imparts movement on the tambour door panel.

9. The cover assembly of claim 8, wherein the tambour door panel includes a plurality of vertically aligned slats that are operatively joined to each other.

10. The cover assembly of claim 9, wherein the plurality of vertically aligned slats are operatively joined by a flexible material.

11. The cover assembly of claim 10, wherein the flexible material is a cloth or leather foundation.

12. The cover assembly of claim 9, wherein the tambour door panel is slidably movable between an extended position when the sliding vehicle door is in a closed position and a retracted position when the sliding vehicle door is in an opened position.

13. The cover assembly of claim 12, wherein the plurality of vertically aligned slats are made of a stiff material, such that the tambour door panel is capable of forming a solid panel that covers the door trim panel slot and the channel when in the fully extended position.

14. A method for covering an opening in a sliding door trim panel comprising:
   providing a door trim panel having at least one slot; a linkage arm operably associated with the sliding door and the vehicle body; a tambour door panel associated with the linkage arm; and a channel located proximate the door trim panel, the channel having a curved portion and an opening capable of allowing the linkage arm to pass through at least a portion of the channel, wherein at least a portion of the tambour door panel sildably travels within the curved portion of the channel;
   generating a sliding movement for the sliding door;
   imparting movement on the linkage arm operably associated with the sliding door; and
   driving the tambour door panel with the linkage arm through the channel to a position that covers at least a portion of the opening in the sliding door trim panel.

15. The method for covering an opening in a sliding door trim panel of claim 14, wherein the door trim panel includes a plurality of vertically aligned slats, the method further comprising extending and retracting the plurality of vertically aligned slats along a horizontal plane.

16. The method for covering an opening in a sliding door trim panel of claim 15, further comprising hingably rotating the plurality of vertically aligned slats about a vertical axis between each slat, thereby allowing translation through the curved portion of the channel.

17. The method for covering an opening in a sliding door trim panel of claim 15, further comprising operatively joining the plurality of vertically aligned slats with a flexible material.

18. The method for covering an opening in a sliding door trim panel of claim 15, further comprising slidably moving the tambour door panel between an extended position by closing the sliding vehicle door and a retracted position by opening the sliding vehicle door.

19. The method for covering an opening in a sliding door trim panel of claim 18, wherein the plurality of vertically aligned slats are made of a stiff material, the method further comprising extending the tambour door panel, thereby forming a solid panel that covers the door trim panel slot and the channel.

* * * * *